United States Patent
Sharbaf et al.

(10) Patent No.: US 11,016,576 B2
(45) Date of Patent: May 25, 2021

(54) REVERSE KEYBOARD ASSEMBLY

(71) Applicant: Finetune Technologies Ltd., Beit Alfa (IL)

(72) Inventors: Shimon Sharbaf, Beit Alfa (IL); Moria Benami, Beit Alfa (IL)

(73) Assignee: Finetune Technologies Ltd., Beit Alfa (IL)

( * ) Notice: Subject to any disclaimer, the term of this patent is extended or adjusted under 35 U.S.C. 154(b) by 161 days.

(21) Appl. No.: 15/677,420

(22) Filed: Aug. 15, 2017

(65) Prior Publication Data

US 2018/0052523 A1 Feb. 22, 2018

Related U.S. Application Data

(60) Provisional application No. 62/375,727, filed on Aug. 16, 2016.

(51) Int. Cl.
*G06F 3/02* (2006.01)
*G06F 1/16* (2006.01)
*G06F 3/041* (2006.01)

(52) U.S. Cl.
CPC ............ *G06F 3/021* (2013.01); *G06F 1/1669* (2013.01); *G06F 3/041* (2013.01); *G06F 2203/04809* (2013.01)

(58) Field of Classification Search
CPC .................... G06F 1/1669; G06F 2203/04809
See application file for complete search history.

(56) References Cited

U.S. PATENT DOCUMENTS

| | | | |
|---|---|---|---|
| 6,121,960 A | 9/2000 | Carroll et al. | |
| 6,243,080 B1 * | 6/2001 | Molne | G06F 3/03547 345/157 |
| 6,492,978 B1 | 12/2002 | Selig et al. | |
| 2003/0235452 A1 * | 12/2003 | Kraus | B41J 5/102 400/472 |
| 2005/0164148 A1 * | 7/2005 | Sinclair | G06F 3/0224 434/112 |
| 2006/0256090 A1 * | 11/2006 | Huppi | A63F 13/2145 345/173 |
| 2010/0253634 A1 * | 10/2010 | Lin | G06F 3/0202 345/170 |

(Continued)

FOREIGN PATENT DOCUMENTS

| | | |
|---|---|---|
| JP | 2001216077 A | 8/2001 |
| RU | 2360277 C2 | 6/2009 |

OTHER PUBLICATIONS

The International Search Report and the Written Opinion of the International Searching Authority for PCT/US2017/046899, ISA/RU, Moscow, Russia, dated Nov. 30, 2017.

(Continued)

*Primary Examiner* — Priyank J Shah
(74) *Attorney, Agent, or Firm* — M&B IP Analysts, LLC

(57) ABSTRACT

A reversed keyboard assembly is provided. The keyboard assembly includes a display unit, a touch screen placed on top of the display unit; and a top cover placed on top the touch screen, wherein top cover covers the touch screen and the display unit, wherein the top cover includes a plurality of transparent keys located in a predetermined distance above the touch screen for enabling a viewing of images displayed on the display unit.

14 Claims, 2 Drawing Sheets

(56) References Cited

U.S. PATENT DOCUMENTS

| | | | |
|---|---|---|---|
| 2010/0277413 A1* | 11/2010 | Wang | G06F 3/0202 |
| | | | 345/168 |
| 2010/0302168 A1* | 12/2010 | Giancarlo | G06F 3/041 |
| | | | 345/169 |
| 2011/0157037 A1* | 6/2011 | Shamir | G06F 3/041 |
| | | | 345/173 |
| 2011/0260976 A1* | 10/2011 | Larsen | G06F 3/04886 |
| | | | 345/168 |
| 2012/0056816 A1 | 3/2012 | Ettinger | |
| 2012/0262309 A1* | 10/2012 | Larsen | G06F 3/0238 |
| | | | 341/22 |
| 2014/0035823 A1* | 2/2014 | Khoe | G06F 3/0237 |
| | | | 345/171 |
| 2014/0143676 A1 | 5/2014 | Tan | |
| 2015/0091804 A1 | 4/2015 | Ito | |
| 2016/0026383 A1* | 1/2016 | Lee | G06F 3/0488 |
| | | | 715/773 |
| 2016/0173664 A1 | 6/2016 | Lewis | |
| 2017/0351420 A1* | 12/2017 | Rigouste | G06F 40/274 |
| 2018/0004305 A1* | 1/2018 | Moseley | G06F 3/0416 |
| 2018/0052523 A1 | 2/2018 | Sharbaf et al. | |
| 2018/0356978 A1* | 12/2018 | Sharbaf | G06F 3/041 |

OTHER PUBLICATIONS

International Search Report and Written Opinion of International Searching Authority for PCT/US2018/047081, ISA/RU, Moscow, Russia, dated Jan. 17, 2019.

\* cited by examiner

REVERSE KEYBOARD ASSEMBLY

CROSS-REFERENCE TO RELATED APPLICATIONS

This application claims the benefit of U.S. Provisional Application No. 62/375,727 filed on Aug. 16, 2016, the contents of which are hereby incorporated by reference.

TECHNICAL FIELD

The present disclosure relates generally to a computer peripheral, and more specifically the disclosure relates to an integrated reverse keyboard.

BACKGROUND

Keyboards are conventionally used for enabling user input into computing devices such as PCs, laptops, and the like. A conventional keyboard usually includes keycaps that provide an immediate tactile feedback to a user upon a user pressing on the keyboard's keycaps. The conventional keyboard is typically composed of multiple rows of permanent keycaps representing different alphanumeric characters.

Despite the discovery of alternative input devices, such as, for example, a virtual keyboard, typing on a conventional keyboard is the most convenient, common, and efficient way for a user to enter data into a computer system. Therefore, the conventional keyboard remains the most widely used and most versatile peripheral used for direct data input into computers.

The virtual keyboard approach has many benefits, including the ability to dynamically change the display for each key. However, one critical disadvantage of virtual keyboards is the discomfort user experience and the typing deficiencies in cases that require a massive typing data entry and where speed and accuracy of data entry is a concern. Additionally, virtual keyboards do not require any physical pressing of keys, which often causes users to lack confidence that the correct key was pressed properly.

Existing keyboard solutions attempt to integrate between a virtual keyboard that includes changeable keys and a conventional keyboard that has traditional, permanent, and physical keycaps where, for example, the keys of the keyboard can be composed on top of a display unit. However, such solutions still possess significant deficiencies as user is unable to achieve a clear view of the content that is displayed under the keys.

Other types of conventional keyboards as assembled in a way that the keys are connected to their base structure. However, such solutions can cause the typing experience to be significantly altered from the traditional keyboard typing experience in a way that can cause lack of comfort or ease of use.

Other existing solutions depict adaptable keyboards in which the individual keys can display different characters depending on the need of the user. While allowing the user to appropriately input various characters of data, this solution does not provide any feedback to the user. Therefore, a user cannot be certain that the input request was transmitted in real-time.

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a reversed keyboard assembly. The keyboard includes a display unit, a touch screen placed on top of the display unit; and a top cover placed on top the touch screen, wherein top cover covers the touch screen and the display unit, wherein the top cover includes a plurality of transparent keys located in a predetermined distance above the touch screen for enabling a viewing of images displayed on the display unit.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
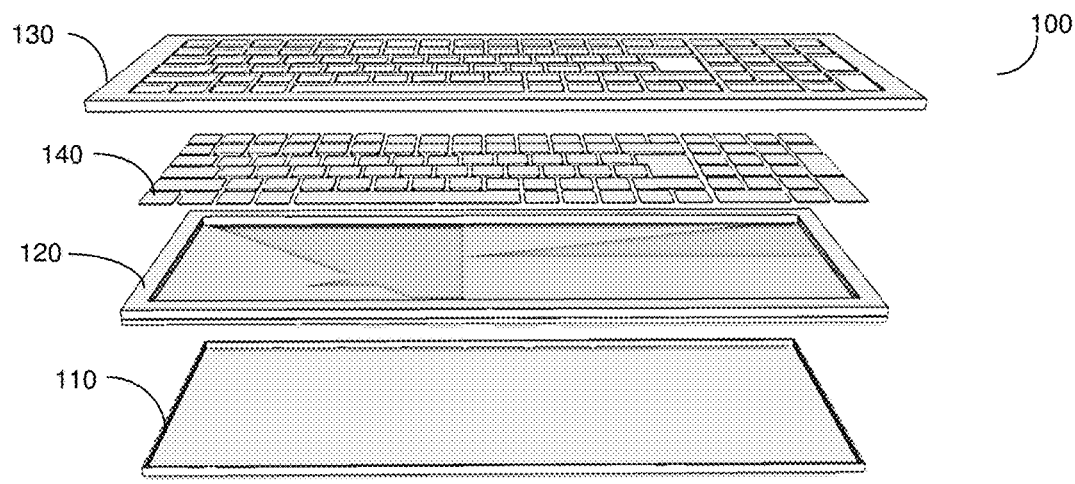
FIG. 1A is an exploded view of the reverse keyboard assembly according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in the plural and vice versa with no loss of generality. In the drawings, like numerals refer to like parts through several views.

The reverse keyboard assembly disclosed herein includes, in an example embodiment, a display unit, a touch screen, a top cover and a plurality of keys. The components of the keyboard assembly enable multi-purpose usage, as each of the plurality of keys can input a plurality of different predetermined values. The display unit may be for example a liquid crystal display (LCD) that may display symbols (or images), such as, but not limited to, letters, numbers, signs, and the like. The symbols can be viewed via each of the plurality of keys.

The display unit also includes a touch screen that is configured to identify a user press. The keys are transparent, depressible and rigid, and are located in a predetermined distance above the touch screen for enabling viewing of the images displayed on the display unit, wherein the predetermined distance can be gapped when a user presses over one of the plurality of keys.

The plurality of keys of the keyboard assembly are physically coupled to an upper side of the keyboard, wherein the upper side is located in a predetermined distance above the lower side of the keyboard 100. Therefore, the keys are not physically and electronically connected to any kind of base structure.

FIG. 1A shows an example exploded view of the reverse keyboard assembly 100 structured according to an embodiment. The reverse keyboard assembly 100 (hereinafter the "keyboard" 100) includes a display unit 110, a touch screen 120, a top cover 130, and a plurality of keys 140.

The keyboard 100 is structured in a way that not all the components are assembled to align on top of each other surrounded by a surrounding frame (not shown in FIG. 1). That is, at illustrated, the display unit 110 is topped by the touch screen 120, the keys 140 are stacked on the touch screen 130, and the top cover is disposed on the keys 140.

Not shown in FIG. 1A are components of the keyboard including, for example, an electrical circuity allowing the operation and electronic connectivity of the keyboard 100, a power source (e.g., batteries), fasteners to fasten each of the four layers together, and elastic members (not shown) to aid in further connecting components and in providing proper key response to its original position after being pressed.

The keyboard 100 may be a wireless keyboard where connectivity to a computer (e.g., a PC) may be achieved over a wireless protocol (e.g., Bluetooth). Alternatively, the keyboard 100 may be a wired keyboard where the connectivity to a computer may be achieved by means of, for example, a universal serial bus (USB) cable, a micro USB cable, a Thunderbolt cable, and the like.

Figure 1B:
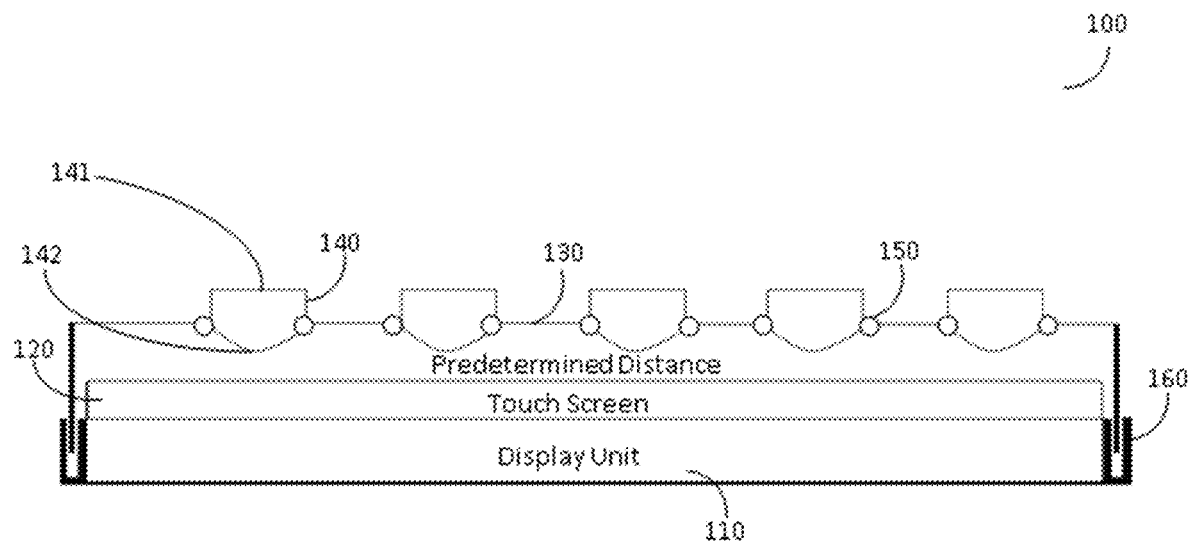
FIG. 1B is a cross-section view a reverse keyboard assembly according to an embodiment.

FIG. 1B shows an example schematic cross-section view of the keyboard assembled according to an embodiment. The numerical references shown in FIG. 1A introduced when discussing FIG. 1A.

As noted above, the keyboard 100 includes a display unit 110. The unit 110 is configured to present a variety of content elements, such symbols or images representing symbols. In an example embodiment, the display unit 110 is an electronic visual screen, such as for example, a liquid crystal display (LCD) display unit, an organic light-emitting diode (OLED) display unit, an electronic ink, and the like.

According to the disclosed embodiment, the display unit 110 may be communicatively connected to a computer via wired connection or a wireless connection. Example for wired connection includes a universal serial bus (USB) connection, micro USB connection, Thunderbolt connection, and the like. The wireless connection may be, for example, a Bluetooth connection.

The touch screen 120 is assembled on top of display unit 110. In an example embodiment, the touch screen 120 is configured to achieve identification of a user gesture, such as, for example, a key press, a swift, multi-finger scroll, and so on. According to one embodiment, the touch screen 120 may be embedded in the display unit 110.

A top cover 130 is disposed on the touch screen 120 to cover the touch screen 120 and the display unit 110. The top cover 130 is a rigid substrate made of, for example, a plastic, metal or a polymeric material, and the like. In an example embodiment, the top cover 130 includes a plurality of transparent, depressible and rigid keys 140. In different embodiment, the keys 140 are not part of the cover 130. In such configuration, the top cover 130 contains apertures for the keys 140.

All keys 140 may be assembled on the same surface, and such surface is located in a predetermined distance above the touch screen 120 to enable the viewing of images displayed on the display unit 110. The plurality of keys 140 may be made of acrylic glass or any other transparent material. The predetermined distance may be, for example, 0.1 millimeter (mm), 2 millimeter (mm), 10 millimeter (mm), above the touch screen. The predetermined distance may be gapped by a user pressing over each of the plurality of keys 140.

In an embodiment, each of the plurality of keys 140 includes an upper edge 141 and a bottom edge 142. The upper edge 141 is structured to receive the direct contact and pressure from the user's finger, i.e. a user press, and responsive thereto, cause bottom edge 142 to be pushed down as well. An air layer is located between the top cover 130 and the touch screen 120. At least one connector 150 may be adapted to hold the plurality of keys 140 in a position at which the plurality of keys 140 are not in contact with the touch screen 120.

In an embodiment, such a connector 150 may be a mechanical element, a flexible element, and so on. For example, the connector 150 may be realized as a spring structured to provide a feedback to a user gesture (e.g., a key press). In another embodiment, the connector 150 may be a built-in component of the top cover 130 or an external element. That is to say that responsive to a user gesture, e.g. a user press, the bottom edge 142 of at least one of the plurality of keys 140 crosses the air layer and touches the touch screen 120.

The keyboard 100 further includes a supporting frame 160. The frame 160 is structured to connect the top cover 130 to the touch screen 120 and the display unit 110. According to a further embodiment, the top cover 130 may be connected to the frame 160 via at least one axis. The axis enables the top cover 130 to move upwards and downwards towards the touch screen 120 for enabling one to access the touch screen 120. This access allows one to clean the touch screen, replace components, and so on.

The frame 160 may be made of a rigid material, such as, but not limited to, plastic. The frame 160 is structured to seal the keyboard 100. According to another embodiment, the top cover 130 that includes the plurality of keys 140 may be structured to disengage from the display unit 110 and the touch screen 120.

According to a further embodiment, the touch screen 120 and the display unit 110 are communicatively and physically connected and located in proximity to a lower side of the keyboard 100. In this arrangement, the top cover 130 including the plurality of keys 140 is located in proximity to an upper side of the keyboard 100.

The lower side of the keyboard 100 is covered by the frame 160 that enables one to physically connect the lower side and the upper side of the keyboard 100. According to another embodiment, the frame 160 may enable the upper side and the lower side of the keyboard 100 to disengage. According to an embodiment, the lower side and the upper side may be distant at a predetermined distance. The predetermined distance enables the plurality of keys 140, located in the upper side of the keyboard 100, to be physically and communicatively disconnected from the touch screen 120 prior to a user gesture, i.e. key press.

According to an embodiment, the touch screen 120 may be a capacitive touch screen. The capacitive touchscreen panel consists of an insulator such as glass, coated with a transparent conductor. In such an embodiment, the plurality of keys 140 may be composed of a transparent and electrical conductor material, such as for example, indium tin oxide (ITO) that enables one to transfer electrical charge(s). The electrical charge(s) may be transferred through the human body and the conductor key based upon a user gesture, e.g. a user press, and by that the capacitive touch screen identifies the press on a certain key 140 of the plurality of keys 140.

According to another embodiment, the touch screen 120 may be a resistive touch screen. A resistive touchscreen is a touch-sensitive computer display composed of two flexible sheets coated with a resistive material and separated by an air gap or microdots. When contact is made to the surface of the touchscreen, the two sheets are pressed together and enable identification of a precise location of the gesture, i.e., the touch. In such an embodiment, the plurality of keys 140 may be composed of a transparent and isolated material. The isolated material may include, for example, a transparent plastic, polycarbonate, and so on. This enables to insulate the electrical charge(s) under at least one key 140 based upon a user gesture.

According to one embodiment, the touch screen 120 may be an optical touch frame (OTF). The OTF uses light-beams that are radiated from the OTF edges. In case at least one of the light-beams is crossed, the OTF is configured to identify the precise location of the press. For example, the plurality of keys 140 are assembled on top of the OTF. Based upon a user gesture, e.g. a user press, on at least one of the plurality of keys 140, the light-beams may be crossed by the bottom edge 142 of the key 140 and by that the OTF enables to determine precisely which of the plurality of keys 140 were pressed.

According to another embodiment, the touch screen 120 may be a surface acoustic wave (SAW) touch screen. The SAW touch screen technique uses ultrasonic waves to detect touch events, such as for example a user press, and the location of the user's input. For example, the plurality of keys 140 are located on top of the SAW touch screen, and based upon a user gesture on at least one of keys 140, the SAWs are absorbed, and the receiving transducers do not register any input. Thus, surface acoustic wave sensors embedded within the SAW touch screen enables to determine the location of the touch event.

According to a further embodiment, a plurality of symbols of for example, letters, numerals, words, signs, and so on may be displayed via the display unit 110. The displayed symbols may be predetermined and provided by a computer application (not shown). The computer application is a software that is configured to provide to the display unit 110 a variety of mutable symbols that may be placed under each of the plurality of keys 140. Furthermore, the computer application may be configured to analyze the data collected from the keyboard 100.

According to another embodiment, the keyboard 100 may be preconfigured by a computer application (not shown) to be designated for a variety of usages. For example, a professional keyboard 100 may be preconfigured for medical usages in hospitals, a professional keyboard 100 may be preconfigured for architects' usage, and so on.

For example, the keyboard 100 may be designed for medical professional enabling them to modify the input transmitted via each key of the keyboard in order to more efficiently control a variety of medical devices. The medical devices may be for that matter, a computed tomography (CT) device, magnetic resonance imaging (MRI) device, and the like.

As another embodiment, the keyboard 100 may also be preconfigured to enhance the experience of gamers that play computer games. For example, through the key that in traditional keyboards represents the letter "Q", the display unit 110 may display an image of an M-16 rifle to switch weapons more rapidly during gaming. According to the same example, the key that usually represents the letter "A" in traditional keyboards may show therein an image of an AK-47 assault rifle displayed on the display unit 110, and so on. According to another embodiment, a driver may be used to enable the communication between the keyboard 100 and a computer. The driver is a computer program embedded within the computer that operates the keyboard 100.

It should be noted that according to some of the disclosed embodiments, the top cover 130 may be supported by one or more supporting components (not shown). Each of the one or more supporting components may be a rigid material such as for example, plastic, that allow to maintain the predetermined distance between the top cover 130 located on the upper side of the keyboard 100 and the touch screen 120 located on the lower side of the keyboard 100.

According to one embodiment, the one or more supporting components may be mounted on the middle portion and/or on the sides of the top cover 130, which can allow the touch screen 120 to identify user gestures without intervening in the operation of the system 100. According to another embodiment, the one or more supporting components may be mounted on the lower side of the keyboard 100.

Figure 2:
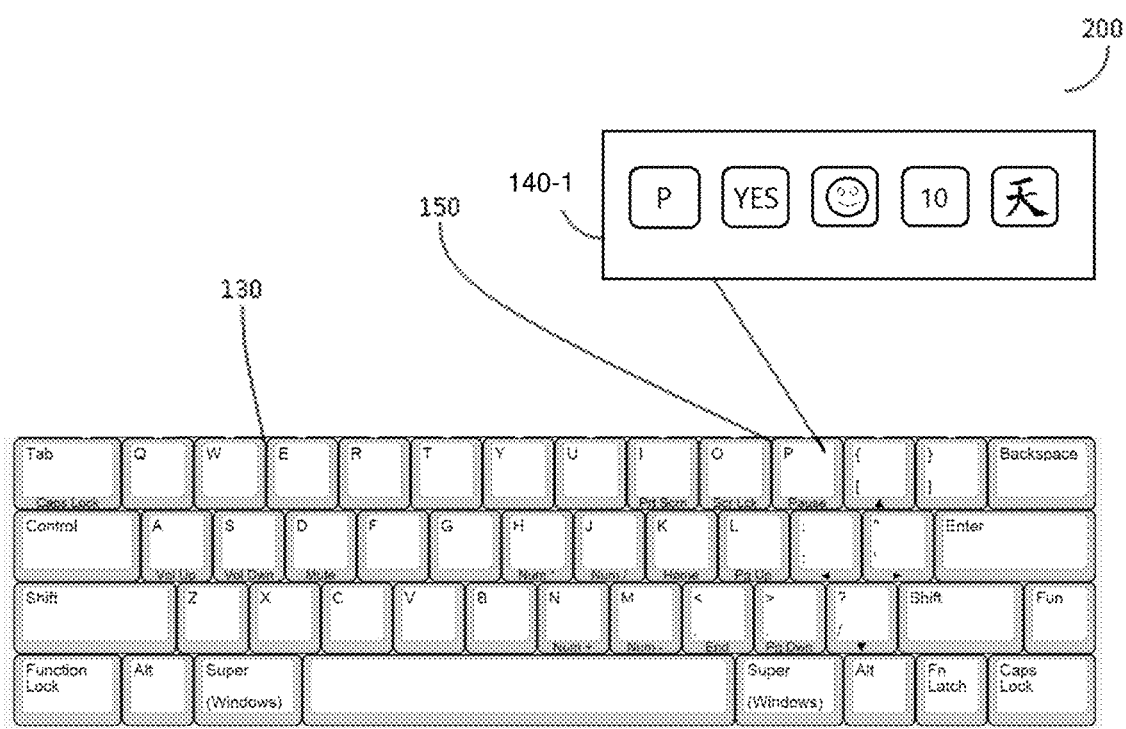
FIG. 2 is a top view of a top cover of the reverse keyboard assembly according to an embodiment.

FIG. 2 depicts an example top view simulation 200 of the top cover 130 according to an embodiment. The plurality of keys 140 are presented from a top view. The plurality of keys 140 are physically connected to the top cover 130 via the at least one connector 150. The plurality of keys 140 may be made of a transparent, depressible and rigid material that enables the user of the computer device to see the mutable images displayed on the display unit 110.

As a non-limiting example, the keyboard 100 may include a plurality of keys 140, i.e., 140-1 through 140-m. The key 140-1 may be structured to enable a user of a computer device to see different and mutable images that are displayed via the display unit 110 through the touch screen 120 and the key 140-1 itself. Such images may be for example: the letter "P", the word "YES", the "smiley", the number "10", a Chinese letter, and the like. It should be noted that the keyboard 100 may be able to display via the display unit 110 and the other components of the keyboard 100 many images that may be displayed on the center of each of the plurality of keys 140.

Some of the embodiments disclosed herein may be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

A person skilled-in-the-art will readily note that other embodiments of the disclosure may be achieved without departing from the scope of the disclosed disclosure. All such embodiments are included herein. The scope of the disclosure should be limited solely by the claims thereto.

What is claimed is:

1. A reversed keyboard assembly, comprising:
 a display unit;
 a touch screen disposed on the display unit;
 a plurality of transparent and rigid keys, wherein the plurality of transparent and rigid keys is located at a predetermined distance above the touch screen for enabling viewing of images displayed on the display unit; and
 a top cover disposed on the touch screen, wherein the top cover is made of a rigid material, wherein the top cover covers the touch screen and the display unit, wherein the top cover includes a plurality of apertures for the plurality of transparent and rigid keys, wherein each of the plurality of transparent and rigid keys is disposed in one of the plurality of apertures such that the predetermined distance is gapped by one of the plurality of transparent and rigid keys when force is exerted thereon; and
 at least one connector holding the plurality of keys in a position separating the plurality of keys from the touch screen, wherein the at least one connector is a spring structured to provide feedback to a user gesture, wherein the connection between each of the plurality of keys and the top cover is achieved by the at least one connector.

2. The keyboard assembly of claim 1, wherein the display unit is any one of: a liquid crystal display (LCD) and an organic led-emitting diode (OLED).

3. The keyboard assembly of claim 1, wherein the touch screen is any one of: a capacitive touch screen, a resistive touch screen, an optical touch frame, an infrared touch frame, and a surface acoustic waves touch screen.

4. The keyboard assembly of claim 3, wherein the keyboard assembly has a lower side and an upper side, wherein the touch screen and the display unit are electrically and physically connected and located in the lower side of the keyboard assembly.

5. The keyboard assembly of claim 4, wherein the top cover is located in the upper side of the keyboard assembly.

6. The keyboard assembly of claim 4, wherein the lower side and the upper side are separated by a predetermined distance.

7. The keyboard assembly of claim 6, wherein the plurality of keys is physically and electronically disconnected from the touch screen and the display unit.

8. The keyboard assembly of claim 4, wherein the keyboard assembly further comprises a supporting frame structured to cover the lower side.

9. The keyboard assembly of claim 8, wherein the supporting frame is structured to physically connect the upper side and the lower side.

10. The keyboard assembly of claim 8, wherein the supporting frame is structured to disengage the upper side and the lower side.

11. The keyboard assembly of claim 1, wherein each of the plurality of keys includes an upper edge and a bottom edge.

12. The keyboard assembly of claim 1, wherein, upon a key press on the upper edge of one of the plurality of keys, the bottom edge of the key touches the touch screen.

13. The keyboard assembly of claim 12, further comprising an optical touch frame configured to generate a light beam and at least one sensor, wherein upon a key press on the upper edge of one of the plurality of keys, the bottom edge of the key crosses the light beam generated by the optical touch frame, wherein upon identification of a crossing of the light beam identified by one of the at least one sensor, the location of a user gesture is identified.

14. The keyboard assembly of claim 1, wherein the connector holds the plurality of keys in a position separating the plurality of keys from the touch screen.

* * * * *